United States Patent [19]
Albrecht et al.

[11] Patent Number: 5,729,399
[45] Date of Patent: Mar. 17, 1998

[54] CONTACT START/STOP DISK DRIVE WITH MINIMIZED HEAD-DISK WEAR IN TEXTURED LANDING ZONE

[75] Inventors: Thomas Robert Albrecht; Thao Anh Nguyen, both of San Jose, Calif.

[73] Assignee: International Business Machines Corporation, Armonk, N.Y.

[21] Appl. No.: 572,285

[22] Filed: Dec. 13, 1995

[51] Int. Cl.⁶ .................................................... G11B 5/54
[52] U.S. Cl. ........................... 360/75; 360/78.04; 360/105
[58] Field of Search ............................ 360/135, 75, 105, 360/103, 78.04, 70

[56] References Cited

U.S. PATENT DOCUMENTS

| | | | |
|---|---|---|---|
| 4,167,765 | 9/1979 | Watrous | 360/103 |
| 4,538,193 | 8/1985 | Dimmick et al. | 360/137 |
| 4,562,500 | 12/1985 | Bygdnes | 360/105 |
| 4,679,102 | 7/1987 | Wevers et al. | 360/75 |
| 4,755,896 | 7/1988 | Okutsu | 360/105 |
| 4,778,582 | 10/1988 | Howard | 204/192.15 |
| 4,831,469 | 5/1989 | Hanson et al. | 360/75 |
| 4,833,550 | 5/1989 | Takizawa et al. | 360/75 |
| 4,894,740 | 1/1990 | Chhabra et al. | 360/103 |
| 4,907,106 | 3/1990 | Yamada | 360/75 |
| 5,062,021 | 10/1991 | Ranjan et al. | 360/135 |
| 5,079,652 | 1/1992 | Ishida et al. | 360/75 |
| 5,095,395 | 3/1992 | Wakatsuki | 360/105 |
| 5,108,781 | 4/1992 | Ranjan et al. | 427/53.1 |
| 5,117,318 | 5/1992 | Immler et al. | 360/105 |
| 5,363,261 | 11/1994 | Eckberg et al. | 360/105 |
| 5,388,017 | 2/1995 | Franco et al. | 360/103 |
| 5,418,667 | 5/1995 | Best et al. | 360/103 |
| 5,446,606 | 8/1995 | Brunner et al. | 360/75 |

FOREIGN PATENT DOCUMENTS

| | | | |
|---|---|---|---|
| 1-166385 | 6/1989 | Japan | G11B 23/00 |
| 1-241070 | 9/1989 | Japan | G11B 21/12 |
| 2-073581 | 3/1990 | Japan | G11B 21/12 |
| 2-146109 | 6/1990 | Japan | G11B 5/82 |
| 3-132980 | 6/1991 | Japan | G11B 21/12 |
| 4-026969 | 1/1992 | Japan | G11B 21/22 |
| 2 121 589 | 12/1983 | United Kingdom | G11B 17/02 |

OTHER PUBLICATIONS

D. W. Albrecht, "Disk with Unlubricated Parking Zone", IBM Technical Disclosure Bulletin, vol. 28, No. 1, Jun. 1985, pp. 318–319.

T. J. Chainer et al., "Load/Unload Disk File Mechanism Incorporating a Separate Raised Read/Write Head Landing Zone", IBM Technical Disclosure Bulletin, vol. 31, No. 5, Oct. 1988, pp. 96–98.

D. R. Gillis et al., "Selection Algorithm for Head Takeoff and Landing Zones", IBM Technical Disclosure Bulletin, vol. 38, No. 07, Jul. 1995, pp. 151–152.

*Primary Examiner*—Andrew L. Sniezek
*Attorney, Agent, or Firm*—Thomas R. Berthold

[57] ABSTRACT

A contact start/stop (CSS) magnetic recording disk drive has a highly textured head easier landing zone on the disk and uses a start/stop precedure that minimize both the time the carrier is in contact with the landing zone and the disk rotational speed during contact. The disk landing zone is textured with a pattern of laser-induced bumps that define a surface higher than the surface of the disk data region. At disk drive start-up and power-down, the head carrier exits and enters the landing zone at a predetermined disk rotational speed selected such that the air-bearing surface of the head carrier is still in contact with the surface of the landing zone but is flying in the data region. This limits the amount of time the carrier spends in contact with the textured surface and minimizes the disk speed when it is in contact. The reduced time and speed of carrier-disk contact in the landing zone improves the landing zone durability for any given texture level, which allows a larger level of texturing (and therefore lower stiction) to be used while maintaining adequate landing zone durability (number of CSS cycles without failure). Disk drive actuator control circuitry for start-up and actuator retract circuitry for power-down permit the head carrier to enter the disk data region while flying, even though the disk is not rotating at full speed and thus head servo positioning information is unavailable, and to exit the disk data region only when the disk has decreased to a speed at which the carrier is just capable of flying.

21 Claims, 8 Drawing Sheets

CONTACT START/STOP DISK DRIVE WITH MINIMIZED HEAD-DISK WEAR IN TEXTURED LANDING ZONE

TECHNICAL FIELD

This invention relates to a contact start/stop (CSS) magnetic recording disk drive that has a dedicated textured landing zone on the disk where the carrier for the recording head rests when the disk drive is not operating.

BACKGROUND OF THE INVENTION

In many types of rotating rigid disk drives, each of the read/write transducers (or heads) is supported on a carrier (or slider) that rides on a cushion or bearing of air above the surface of its associated disk when the disk is rotating at its operating speed. The slider has an air-bearing surface (ABS), typically in the form of a plurality of rails, and is connected to a linear or rotary actuator by means of a relatively fragile suspension. There are typically multiple disks (called a disk stack) that are mounted on the hub that is rotated by the disk drive spindle motor, and multiple sliders attached to the actuator. The actuator moves the sliders radially so that each head may access the recording area of its associated disk surface as the spindle motor rotates the disk stack.

In these conventional disk drives the slider is biased towards the disk surface by a small force from the suspension. The ABS of the slider is thus in contact with the disk surface from the time the disk drive is turned on until the disk reaches a speed sufficient to cause the slider to ride on the air-bearing. The ABS of the slider is again in contact with the disk surface when the disk drive is turned off and the rotational speed of the disk falls below that necessary to create the air-bearing.

The disk for use in such CSS rigid disk drives is a thin film metal alloy disk that typically comprises a substrate, such as glass or an aluminum-magnesium (AlMg) alloy with a nickel-phosphorous (NiP) surface coating, and a cobalt-based magnetic alloy film formed by sputter deposition over the substrate. A protective overcoat, such as a sputter-deposited amorphous carbon film, is formed over the magnetic layer to provide corrosion resistance and wear resistance from the ABS of the slider. Assignee's U.S. Pat. No. 4,778,582 describes a protective amorphous hydrogenated carbon overcoat formed by sputtering a graphite target in the presence of Ar and hydrogen ($H_2$). A liquid fluoroether lubricant is also maintained on the surface of the protective disk overcoat to prevent damage to the head and the disk during starting and stopping of the disk.

To improve the wear resistance of the disk, as well as to maintain consistent magnetic properties, it is generally desirable to make the disk surface as smooth as possible. However, a very smooth disk surface creates an additional problem in CSS disk drives, which is referred to as "stiction". This means that after the slider ABS has been in stationary contact with the disk for a period of time, the slider tends to resist translational movement or "stick" to the disk surface. It is known that this "stiction" force can increase over time. Thus the stiction force measured relatively soon after a CSS cycle is referred to as "CSS stiction", while that measured several hours after a CSS cycle is referred to as "rest stiction". Stiction is caused by a variety of factors, including static friction and adhesion forces between the disk and slider created by the lubricant, typically the mobile lubricant. Stiction in a CSS disk drive can result in damage to the head or disk when the slider suddenly breaks free from the disk surface when disk rotation is initiated. In addition, because the suspension between the actuator and the slider is relatively fragile to permit the slider to fly above the disk surface, sudden rotation of the disk can also damage the suspension. In some disk drives, such as low-power disk drives used in laptop and notebook computers, the spindle motor may simply be unable to initiate rotation or achieve operating speed because of the adhesion forces that cause stuck sliders or excessive drag.

To minimize the effect of stiction, CSS disk drives often use a dedicated textured "landing zone" where the slider is parked when the disk drive is not operating. Typically, the landing zone is a specially textured nondata region of the disk. The disk substrate is textured before deposition of the magnetic layer and other layers, including the protective overcoat, that make up the magnetic recording disk. These layers replicate the texture of the underlying substrate and thus reduce the stiction when the slider is resting on the disk. Disk texturing may be done by an abrasive roughening process that removes substrate material. Another technique for texturing the disk substrate is by pulsed laser radiation. U.S. Pat. No. 5,108,781 describes a process for laser texturing by forming overlapping pits or craters in the substrate. IBM's copending application, Ser. No. 08/150,525, describes a process for using a diode-pumped laser for texturing the disk substrate with an array of spaced-apart bumps. IBM's copending application, Ser. No. 08/149,851, describes a process for laser texturing glass disk substrates. Unlike abrasive roughening, laser texturing is not a subtractive process, but instead locally melts portions of the substrate surface, resulting in raised bumps and/or crater rims that extend above the substrate surface.

To minimize stiction in the landing zone, and thus improve the ease with which the disk drive can be started, it is desirable to use as high a level of texturing as possible. However, it is difficult to make a highly textured landing zone sufficiently durable to withstand frequent full speed contact with the head carrier during the CSS cycles.

What is needed is a CSS disk drive that has a disk landing zone with a maximum amount of texturing to minimize stiction, but that also operates in a manner that minimizes wear of this highly textured landing zone and the head carrier that comes into contact with the landing zone.

SUMMARY OF THE INVENTION

The invention is a CSS disk drive with a highly textured landing zone and a start/stop procedure that minimizes both the time the carrier is in contact with the landing zone and the disk rotational speed during contact. In the preferred embodiment the landing zone is textured with a pattern of laser-induced bumps that define a surface higher than the surface of the data region. At disk drive start-up and power-down, the carrier exits and enters the landing zone at a predetermined disk rotational speed selected such that the air-bearing surface of the head carrier is still in contact with the surface of the landing zone but is flying in the data region. This limits the amount of time the carrier spends in contact with the textured surface and minimizes the disk speed when it is in contact. The reduced time and speed of carrier-disk contact in the landing zone improves the landing zone durability for any given texture level, which allows a larger level of texturing (and therefore lower stiction) to be used while maintaining adequate landing zone durability (number of CSS cycles without failure). In the preferred disk drive start-up procedure the velocity of the actuator at low disk speed is servo controlled by use of the actuator back electromotive force (EMF). This permits the head carrier to enter the disk data region while flying even though the disk is not rotating at full speed and thus head servo positioning information is not available to servo control the actuator. In the preferred disk drive stop or power-down procedure the actuator is not retracted to move the carrier back to the landing zone until the disk has decreased to the predetermined rotational speed at which the carrier is just capable of flying. This is accomplished by circuitry that senses the removal of disk drive power and then enables actuator retract, but only after a predetermined time delay or after the measured spindle motor rotational speed has reached a predetermined value.

For a fuller understanding of the nature and the advantages of the present invention, reference should be made to the following detailed description taken in conjunction with the accompanying drawings.

DESCRIPTION OF THE PREFERRED EMBODIMENTS

Figure 1:
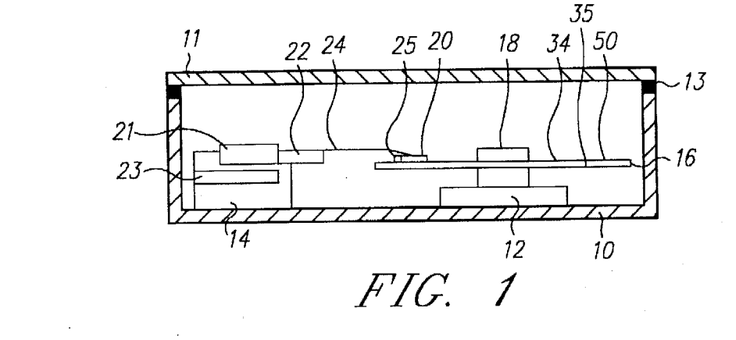
FIG. 1 is a schematic side view of the disk drive according to the present invention.
Figure 2:
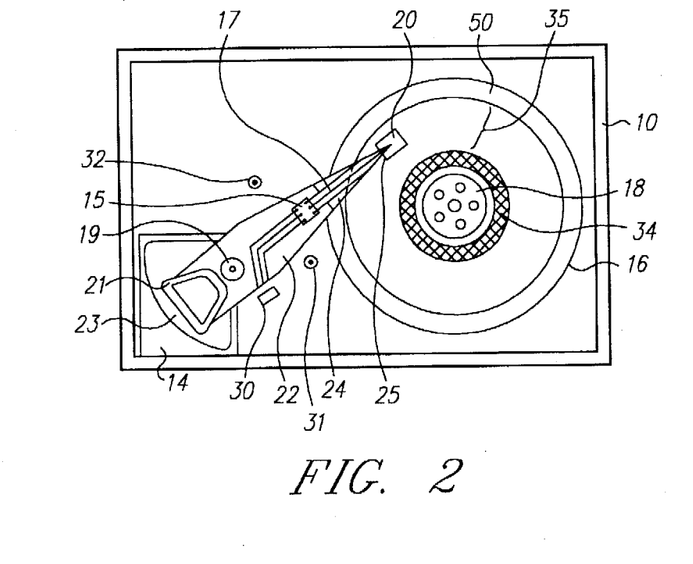
FIG. 2 is a top view of the disk drive of FIG. 1 with the cover removed and illustrating the textured landing zone.

For ease of illustration and explanation, the disk drive depicted in FIGS. 1 and 2 is shown as having a single recording head and associated disk surface, although conventional disk drives typically have multiple heads and disks.

Referring first to FIG. 1, there is illustrated in sectional view a schematic of the CSS disk drive according to the present invention. The disk drive comprises a base 10 to which are secured a disk drive or spindle motor 12 and an actuator 14, and a cover 11. The base 10 and cover 11 provide a substantially sealed housing for the disk drive. Typically, there is a gasket 13 located between base 10 and cover 11, and a small breather port (not shown) for equalizing pressure between the interior of the disk drive and the outside environment. A magnetic recording disk 16 is connected to spindle motor 12 by means of a spindle or hub 18. The disk 16 has a dedicated textured landing zone 34 near the disk inside diameter (ID) away from the disk data region 35. A thin film 50 of lubricant is maintained on the surface of disk 16. The lubricant may be a conventional perfluoropolyether (PFPE) disk lubricant, such as Z-DOL brand from Montedison. A read/write transducer or head 25 is formed on the trailing end of a head carrier, such as an air-bearing slider 20. Head 25 may be an inductive read and write transducer or an inductive write head with a magnetoresistive (MR) read head formed by thin-fill deposition techniques as is known in the art. The slider 20 is connected to the actuator 14 by means of a rigid arm 22 and a suspension 24, the suspension 24 providing a biasing force that urges the slider 20 onto the surface of the recording disk 16. The arm 22, suspension 24, and slider 20 with head 25 are referred to as the head-arm assembly. The actuator 14 is a balanced rotary voice coil motor (VCM) having a coil 21 that moves through the fixed magnetic field of magnet assembly 23 when current is applied to the coil. An inside diameter (ID) crash stop 31 (FIG. 2) and an outside diameter (OD) crash stop 32 are mounted to base 10 to limit the travel of rotary actuator 14. The crash stops 31, 32 are typically rigid posts with elastomeric O-rings. Alternatively, the crash stops may be rubber bumpers or resilient cantilever beams. A latch 30 is also mounted to base 10 for engagement with the actuator or actuator arm 22 to restrain movement of the actuator 14 when the disk drive is not operating. Latch 30 may be a passive magnetic latch whose restraining force is overcome by a sufficiently large current pulse to the coil 21, or an active latch such as a solenoid type latch. An active latch typically provides minimal restraining force for the actuator to overcome since once the latch is opened the actuator is free to pivot.

When the disk drive is stopped the actuator 14 will be at its parking location, i.e., with the actuator arm 22 latched by latch 30 and with the air-bearing surface of slider 20 in contact with the textured surface of the disk landing zone 34 near the disk ID. During operation of the disk drive, the spindle motor 12 rotates the disk 16 at a constant speed, and the actuator 14 is unlatched and pivots on shaft 19 to move the slider 20 generally radially across the surface of the disk 16 so that the read/write head 25 may access different data tracks on disk 16. The precise data track accessing and centerline positioning is accomplished by control electronics that receive servo positioning information recorded on the disk and read by the head. Typically this servo positioning information is pre-recorded in servo sectors that are angular spaced around the disk and interspersed with the data in the data tracks in the data region.

FIG. 2 is a top view of the interior of the disk drive with the cover 11 removed, and illustrates in better detail the suspension 24 that provides a force to the slider 20 to urge it toward the disk 16. The suspension may be a conventional type of suspension such as the well-known Watrous suspension, as described in U.S. Pat. No. 4,167,765, assigned to IBM. This type of suspension also provides a gimbaled attachment of the slider that allows the slider to pitch and roll as it rides on the air bearing. The data detected from the disk data region 35 by the head 25 is processed into a data readback signal by signal amplification and processing circuitry in the integrated circuit chip 15 located on arm 22. The signals from head 25 travel via flex cable 17 to chip 15, which sends its output signals via cable 19.

Figure 3A:
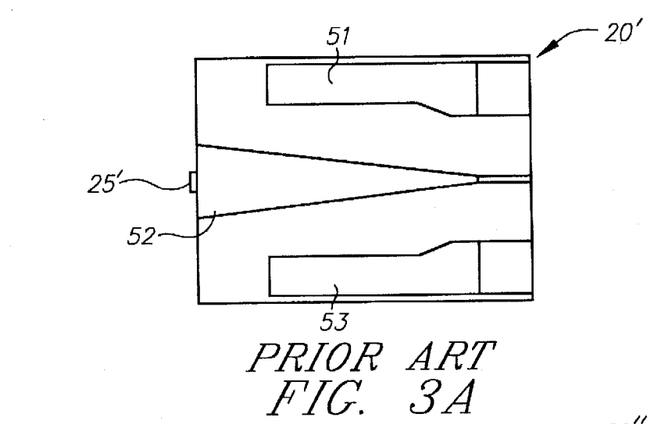
FIGS. 3A–3B are illustrations of the air-beating surfaces (the sides that face the disk) of typical head carriers.
Figure 3B:
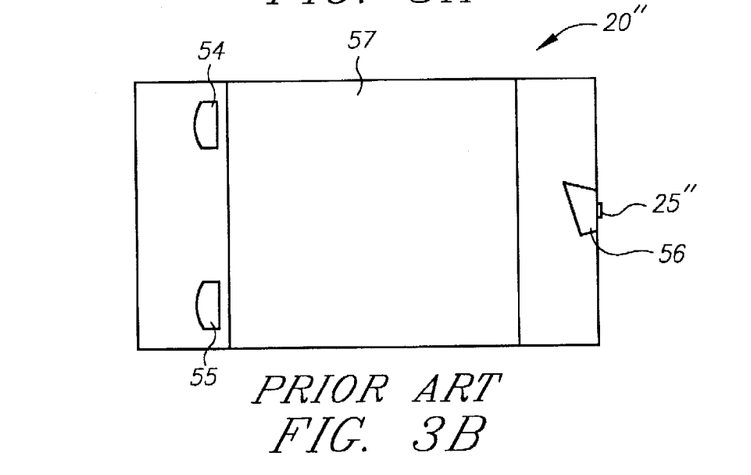

FIGS. 3A–3B illustrate the air-beating surfaces (the sides that face the disk 16) of typical head carriers. FIG. 3A shows an air-bearing slider 20' with rails 51, 52, 53 that form the air-bearing surface and with head 25' located on the rear or trailing edge. This slider 20' is the three-rail slider described in IBM's U.S. Pat. No. 4,894,740. FIG. 3B shows a carrier 20" of the type designed for near-contact or proximity with the disk 16, i.e. a carrier wherein the rear portion is very near the disk surface and may make occasional contact with the disk surface, even though a substantial portion of the carrier is supported by the air-bearing surface. The front air-bearing surface of carrier 20" is a pair of air-bearing pads 54, 55 that provide the air-bearing effect to support the front end of carrier 20" above the disk. The pads 54, 55 extend from a front ridge section that acts as a step taper for the pads. A rear air-bearing pad 56 is located near head 25" and extends from a rear ridge section that also acts as a step taper. The front and rear ridge sections are oriented generally parallel with each other and are separated by a central nonair-bearing surface 57 that extends across the entire width of carrier 20". The nonair-bearing surface 57 removes any air lift in that region of the carrier 20", thus minimizing the total air lift on carrier 20" and assuring that the front end is pitched up to enable air to flow under pitched-up rear pad 56. This carrier 20" is described in IBM's U.S. Pat. No. 5,418,667.

Figure 4:
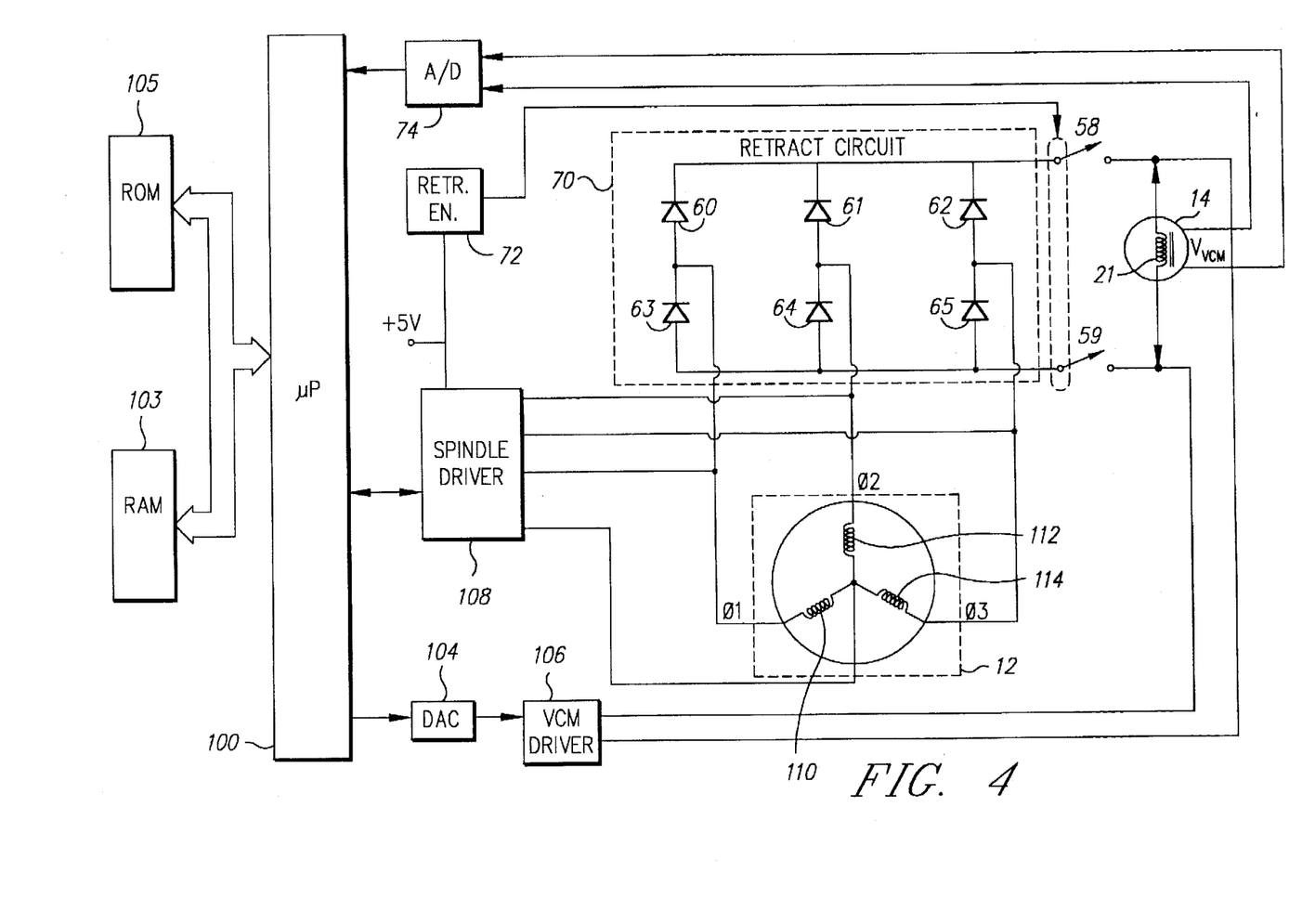
FIG. 4 is a block diagram of the actuator control circuitry, including the use of back EMF for velocity control, the spindle motor control circuitry, and a conventional actuator retract circuit.

Referring now to FIG. 4, the drive includes a microprocessor 100 that controls the VCM actuator 14 and the spindle motor 12. Microprocessor 100 is connected via a data bus to RAM 103 and ROM 105. During read and write operations, the microprocessor 100 receives head servo position information read by the head 25 (FIG. 2) from the tracks in disk data region 35 and generates digital output to a digital-to-analog converter (DAC) 104. The servo algorithm for controlling current to the coil 21 of the VCM actuator 14 in response to servo positioning information read by the head 25 is stored in ROM 105. DAC 104 is coupled to a VCM driver 106 that sends current pulses to the coil of VCM actuator 14 to move the head 25 on slider 20 to the appropriate data track on disk 16 during track "seeking" and to maintain the head 25 on track during track "following". Microprocessor 100 also controls and is connected to the spindle motor 12 via spindle driver 108. The spindle driver 108 controls the current from the power supply (e.g., a 5V battery source in the case of notebook and laptop computers) to the windings of spindle motor 12 to rotate the motor at a constant rotational speed during drive operation. In addition, the spindle driver 108 provides a status signal to microprocessor 100 indicating whether or not the spindle motor 12 is rotating at its operating speed. The spindle motor 12 may be a "delta" or "Y" (as shown in FIG. 4) type brushless, three-phase motor with fixed windings 110, 112, 114 as field coils and a permanent magnet rotor.

FIG. 4 also illustrates a conventional disk drive actuator retract circuit 70 for energizing the VCM actuator 14 at disk drive power down using the back electromotive force (EMF) from spindle motor 12 windings 110, 112, 114. The design of the VCM driver 106 and spindle driver 108 is such that when power is removed, their respective output lines to the VCM actuator 14 and spindle motor 12 behave as open circuits (disconnected). When power is removed, a retract enable circuit 72 (to be described in detail below) closes switches 58 and 59, which may be relays, solid state switches such as FETs, or other switching devices. The VCM actuator 14 and spindle motor 12 are then effectively disconnected from the VCM driver 106 and spindle driver 108, and connected to retract circuit 70. The retract circuit 70 includes diodes 60–65 that form a conventional three-phase, full-wave rectifier. While this specific retract circuit 70 shown in FIG. 4 is used in commercial disk drives that "unload" the actuator at disk drive power-down by forcing the suspension to ride up a ramp that lifts the head carriers off the disk surfaces, it may also be used in CSS disk drives. When power is removed, the spindle motor 12 (and the disks mounted on it) continue spinning due to rotational inertia. Back EMF in the spindle motor 12 results in the generation of AC currents in the motor windings 110, 112, 114. The spindle motor 12 essentially behaves as a three-phase AC generator, and the resulting output current is rectified by the rectifier circuit 70. The output of the rectifier circuit 70 is a DC current that flows through the now closed switches 58 and 59 to the coil 21 of VCM actuator 14, causing the VCM actuator 14 to move to its power-off parking location with slider 20 (FIG. 2) coming to rest on the textured landing zone 34 of disk 16 near the disk ID.

The retract circuit 70 may also be the more simple conventional retract circuit used in CSS disk drives, i.e., a single-phase half-wave rectifier with a single conventional silicon diode. In this type of retract circuit the single diode is located between one of the spindle motor 12 windings 110, 112, 114 and switch 58. The other phases of the spindle motor 12 are used to brake the actuator during retract. This type of CSS disk drive retract method and circuitry is described in IBM's U.S. Pat. No. 4,831,469.

Also as shown in FIG. 4, the voltage of actuator coil 21 is measured and input to microprocessor 100 via A/D converter 74. As will be described in detail below, this measured value, $V_{vcm}$, is used to control the velocity of the VCM actutator 14 at low spindle RPM by use of the actuator back electromotive force (EMF). At low spindle RPM disk servo positioning information is not available to control the actuator. The actuator back EMF servo algorithm is stored in ROM 105.

The present invention improves the durability of the landing zone in CSS disk drives, minimizes wear of both the disk and the carrier in the landing zone, and reduces stiction. In this improved disk drive, the textured landing zone has a surface higher than the surface of the data region. At disk drive start-up and spin-down, the carrier exits and enters the landing zone with the air-bearing surface in contact with the surface of the landing zone. This limits the amount of time the carrier spends in contact and minimizes the disk speed when it is in contact. The reduced time and speed of carrier-disk contact in the landing zone improves the landing zone durability for any given texture level, which allows a larger level of texturing (and therefore lower stiction) to be used while maintaining adequate landing zone durability (number of disk drive start/stop cycles without failure).

Figure 5:
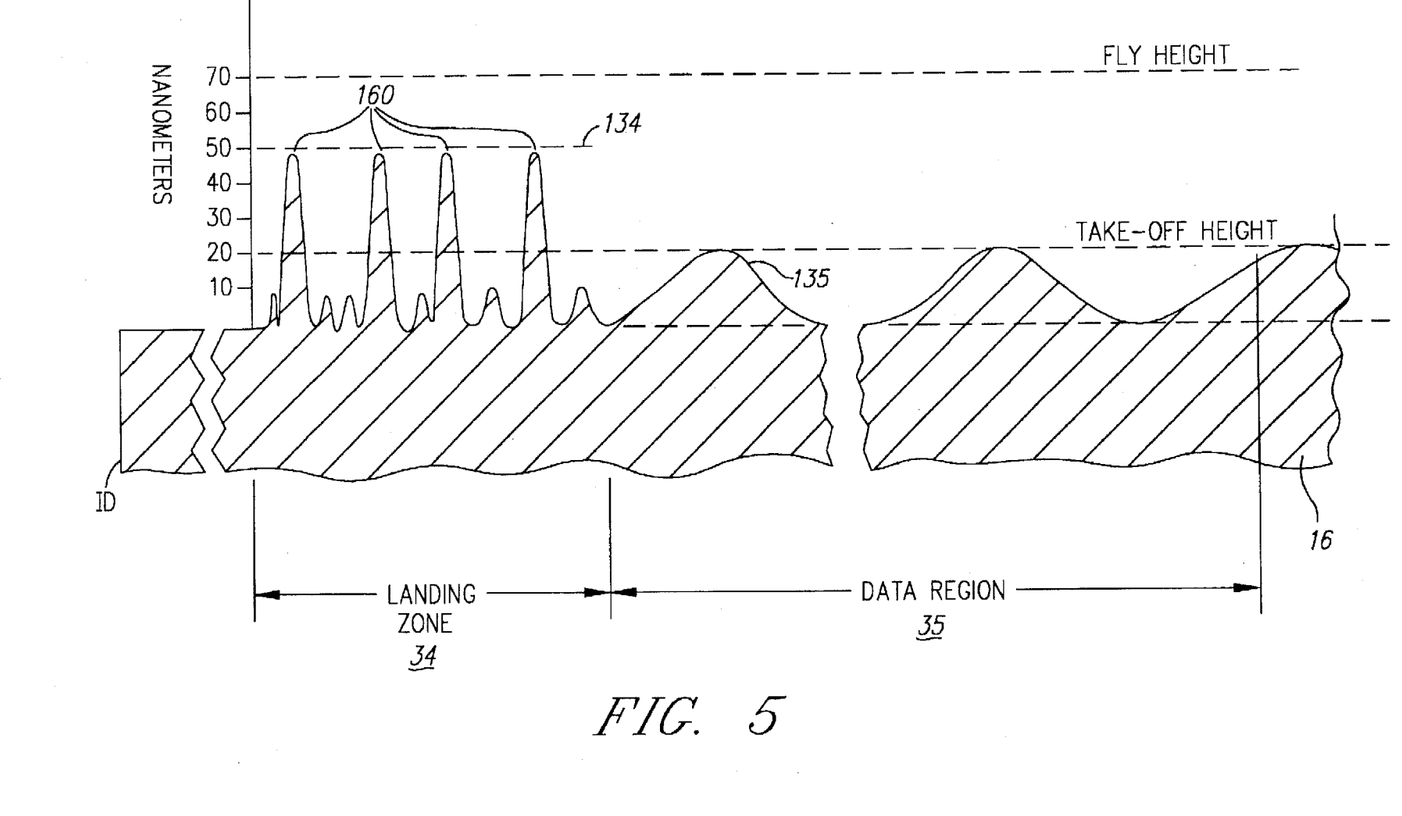
FIG. 5 is a partial sectional view of the disk illustrating the heights of the textured landing zone and the data region.

FIG. 5 is a diagram depicting the cross-section of the disk 16 at the transition of the landing zone 34 and the data region 35. In this embodiment for a 3.5 in. disk, the landing zone 34 has a width of approximately 3 mm. and is textured so that the texturing peaks define a surface 134 raised above the disk surface 130 to an average height of about 50 nm. The data region 35 is shown to the right of the textured landing zone 34 in FIG. 5 and has no texturing but has a surface 135 with an average peak-to-peak roughness of 15–20 nm. In the preferred embodiment the disk substrate is AlMg with a NiP surface coating and the surfaces 134, 135 are the surface of the outer protective amorphous hydrogenated carbon overcoat. In the preferred embodiment the texturing in the landing zone 34 is a pattern of like generally symmetrically-shaped laser-induced bumps 160 that result in the surface 134 of the landing zone 34 being higher than the surface 135 of the untextured data region 35. Each of the bumps 160 is formed by a single laser pulse and results in a bump that can be formed with a diameter in the range of approximately 5–30 microns. The bumps 160 have an average spacing or separation, in the range of approximately 50–100 microns, depending on the disk rotational rate and laser pulse repetition rate during the laser texturing, as described in IBM's copending application Ser. No. 08/150,525. Alternatively, the bumps may be overlapping, as described in the previously cited '781 patent. The bumps are formed by pulsing a laser beam on the disk substrate surface while the disk rotates. The position of the laser is fixed and the disk is supported on a translation stage that moves radially while the disk rotates so that the bumps are formed in a spiral track across the landing zone 34. The bumps 160 are formed by the pulsed laser heating of the NiP coating of a conventional AlMg disk blank. However, the bumps may also be formed on other substrate materials, such as glass or ceramic (e.g., Memcor brand substrate from Corning Glass). Also, instead of being formed on the disk substrate surface, the bumps may instead be formed on one of the subsequently deposited disk layers, such as the disk protective overcoat. Because the bumps 160 are spaced apart from each other with a spacing of 50–100 microns they occupy only approximately 1–5% of the surface area in the landing zone 34.

Figure 6:
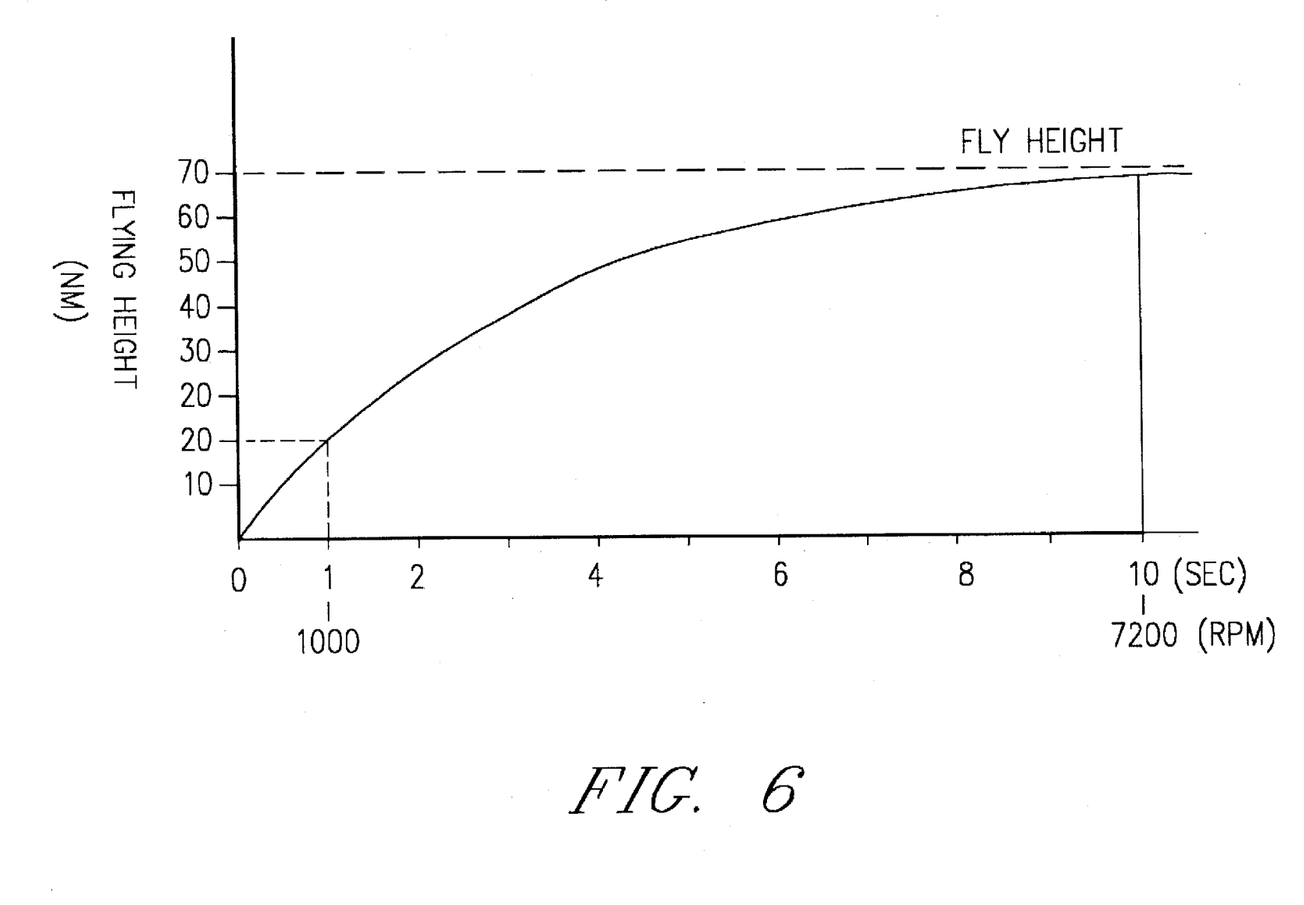
FIG. 6 is a graph of head carrier flying height as functions of disk RPM and time from commencement of spindle motor spin-up.

FIG. 6 is a graph of carrier fly height above the surface 152 of the disk data region 35 as a function of disk RPM. As shown, it takes the disk approximately 10 sec. to reach its operating speed of 7200 RPM. At this disk speed the fly height of the carrier is approximately 70 nm. The graph of FIG. 6 is for a 3.5 in. disk drive with a disk having the average roughness described above for FIG. 5 and with a carrier having a specific type and shape of air-bearing surface, but the graph is generally representative of all disk drives. In conventional CSS disk drives the actuator does not move the carrier out of the landing zone until the disk reaches its operating speed, and the carrier is returned to the landing zone immediately at disk drive power down while the disk is still rotating at high RPM. However, in the present invention the actuator 14 moves the carrier out of the landing zone 34 well before the disk reaches its operating speed and while the air-bearing surface of the carrier is still in contact with the textured surface 134 of landing zone 34. As shown by the vertical axis of FIG. 6, the air-bearing surface of the carrier would be at approximately 20 nm. above the disk surface 130 at approximately 1000 RPM (approximately 1 sec. after disk spin-up begins) if at this time it were positioned over the data region 35. This corresponds to the "take-off" height of the carrier, or the height of the carrier above the surface 135 of the data region 35, at which time it would no longer be in contact with the disk data region surface. This height is essentially the average surface roughness of the disk in the data region. However, at this disk speed (1000 RPM) the carrier air-bearing surface would remain in contact with the surface 134 of the landing zone 34 if it were still positioned in the landing zone because the laser-induced texturing bumps have an average height of 50 nm, which is greater than the take-off height of 20 nm.

While in the preferred embodiment illustrated by FIG. 5, the surface 134 of the landing zone 34 is higher than the surface 135 of the untextured data region 35, the invention is fully operable with any type of disk drive that has a landing zone with more texturing than the data region, regardless of their relative surface heights. This includes disk drives that may have some texturing in the data region. The topography of the data region is determined strictly on the basis of magnetic recording performance. While this usually demands as smooth a surface as possible, some level of texturing may be beneficial depending on desired track width, bit density, etc. In such a disk drive the rotational disk speed at which the carrier will take off or first fly over the data region will be a speed at which it will be in contact with the surface of the textured landing zone. Thus if the landing zone were textured by abrasive polishing that removes material, the landing zone surface may be slightly lower than the surface of the data region. However, in this case the carrier may initially contact the data region surface as it moves radially outward but will fly immediately when the carrier's air-bearing surface reaches the data region because the carrier's entry into the data region will occur at a predetermined spindle motor RPM when it is known that the carrier will fly.

In the preferred embodiment of the present invention, the actuator moves the carrier out of the landing zone only 1 sec. after disk spin-up begins. In addition, at disk drive power down the movement of the carrier back into the landing zone 34 is delayed until the disk 16 is at low RPM, preferrably at a speed where the air-bearing surface of the carrier would be in contact with the surface 134 of the landing zone 34. The manner in which this is accomplished in the disk drive of the present invention is explained below.

To reliably move the carrier into and out of the landing zone at low spindle RPM it is necessary to insure that the actuator is properly controlled. In conventional CSS disk drives, the actuator is latched in a fixed position in the landing zone at all times, except when the spindle is at full RPM. Movement of the actuator outside the landing zone is controlled through the use of the servo positioning information recorded in angularly spaced sectors on the data tracks in the disk data region. The actuator control circuitry includes servo decoders that typically rely on the periodicity of the angularly spaced servo sectors to decode the servo information. This requires an approximately constant spindle speed to hold the servo sampling frequency approximately constant.

In conventional CSS drives, it may be problematic to move the actuator without servo control. To unlatch the actuator and exit the landing zone, a momentary large current pulse is applied to the coil of the VCM to generate a large torque to the actuator. This is especially the case in disk drives that use a magnetic actuator latch that applies a relatively large restraining force. The actuator releases from the latch with a high velocity, and without some type of control, would impact the OD crash stop at high velocity. While the OD crash stop can be made to absorb such a large shock, doing so requires a large compression range for the crash stop, which consumes disk real estate. Therefore it is desirable to be able to control and brake the actuator upon release from the latch if the actuator exits the landing zone at low RPM because disk servo positioning information is not available to control the actuator.

Thus, in the preferred embodiment the actuator is controlled at arbitrary disk RPM without relying on disk servo positioning information. There are three cases where exit and entry of the landing zone at low spindle RPM must be accommodated: 1) exiting the landing zone at low RPM during spin-up with disk drive power on; 2) entering the landing zone at low RPM with disk drive power on (for example, entering at initiation of a power-reduced "standby" mode commonly used in disk drives in laptop computers); and 3) entering the landing zone at low RPM during spin-down with disk drive power off. In the preferred embodiment of the present invention, actuator back EMF is used to control actuator velocity and position for cases 1 and 2, and a constant voltage or current is applied to the actuator when the spindle reaches the target RPM for entry into the landing zone for case 3.

Referring again to FIG. 4, control of the actuator 14 by use of back EMF is implemented by measuring $V_{vcm}$ across actuator coil 21. The voltage $V_{vcm}$ across the VCM coil 21 is given by $$V_{vcm} = I*R + V_{bemf}$$ (1)

where I is the VCM current, R is the VCM coil resistance, and $V_{bemf}$ is the back EMF voltage. The voltage $V_{vcm}$ also contains a transient inductive term which may be ignored if a sufficiently slow control loop is used. The back EMF voltage Vbemf is directly proportional to the actuator velocity. Thus, actuator velocity may be computed from measured values of $V_{vcm}$, I, and R as follows:

$$V_{bemf} = V_{vcm} - I*R.$$ (2)

Since $V_{bemf}$ is typically small compared to $V_{vcm}$ and I*R, it is necessary to measure R with sufficient accuracy. Since R varies with the temperature of coil 21, it is desirable to measure R immediately before using $V_{bemf}$ to servo the actuator. This is accomplished by first applying a known current $I_{meas}$ to the VCM coil 21 in a way that holds the actuator 14 fixed against a crash stop (31 or 32), thereby assuring that $V_{bemf}=0$, and then measuring the corresponding voltage, $V_{meas}$. Then R is computed as follows:

$$R = V_{meas}/I_{meas}.$$ (3)

The value of R is measured in this manner each time at disk drive power on and its value stored in RAM 103. Once an accurate measurement of R has been obtained, actuator velocity may be controlled to a predetermined target voltage $V_{targ}$, corresponding to a target actuator velocity, through the use of a proportional+integral (PI) servo loop. The servo loop is under the control of the microprocessor 100. Current values are applied to the actuator coil 21 by the VCM driver 106 as programmed by the algorithm stored in ROM 105. The $V_{vcm}$ is measured and its digital value input to microprocessor 100 via A/D converter 74. The microprocessor 100 computes $V_{bemf}$ from equation (2), and an error voltage corresponding to the velocity error as follows:

$$V_{err} = V_{bemf} - V_{targ}.$$ (4)

The microprocessor 100 uses the PI servo loop to calculate the coil current from the computed value of $V_{err}$. During servoing, microprocessor 100 periodically updates the coil current values and outputs signals to DAC 104 to continually adjust the VCM current to make $V_{err}=0$, thereby maintaining the actuator at the target velocity.

While the above-described actuator back EMF method is the preferred method for servo control of actuator velocity in the absence of disk servo positioning information, other actuator velocity servoing methods are possible, such as the use of a separate optical or magnetic sensor for providing actuator position or velocity information.

Exiting the Landing Zone at Low RPM at Disk Drive Power On

At disk drive power on, the following sequence of events occurs. The disk drive accelerates the spindle motor 12 until the target escape RPM is reached, e.g. 1000 RPM in the embodiment illustrated by FIGS. 5 and 6. The actuator 14 is then unlatched by applying a current pulse of sufficient magnitude to overcome the magnetic restraining force of the latch 30. The carrier (slider 20 in FIGS. 1 and 2) remains in contact with the surface 134 (FIG. 5) of the landing zone 34 as it moves radially toward the data region 35. When the carrier reaches the data region (approximately 1 sec. after commencement of spindle spin-up) it is "flying" since it is above the surface of the data region 35 and is supported by its air-bearing surface. Upon unlatching, back EMF servo of the actuator 14 takes over to control and brake the actuator 14 in the data region 35, so that it does not impact the OD crash stop 32 at an uncontrolled high velocity. The spindle continues to accelerate until full RPM, e.g., 7200 RPM, is reached. At this point, normal actuator control using disk servo positioning information takes over, and the drive functions in the conventional manner. Thus even though it has taken approximately 10 sec. for the spindle motor 12 to reach its operating speed (FIG. 6), the carrier has been in contact with the landing zone 34 for only 1 sec. of this time. It exits the landing zone 34 in contact and enters the data region 35 while flying.

In the preferred embodiment the time at which the spindle motor 12 reaches the target escape RPM (e.g., 1000 RPM) is determined from its known acceleration profile, such as that depicted in FIG. 6. In this case the actuator 14 would be unlatched from latch 30 at 1 sec. after the initiation of spin-up since at that time the spindle motor 12 would be at 1000 RPM. Alternatively, the actual spindle RPM may be measured by the periodicity of back EMF pulses from the spindle motor 12 as detected by the spindle motor driver 108 and input to microprocessor 100, or by other known sensing methods, such as Hall effect sensing. Once the target spindle RPM has been reached, the spindle continues to accelerate to 7200 RPM. Alternatively, the microprocessor 100 may signal the spindle driver 108 to pause at a fixed RPM until the actuator unlatching procedure has been successfully completed, and to then accelerate to its operating speed.

If the actuator latch 30 is a passive latch, such as a magnetic latch, it is opened by applying the actuator back EMF servo loop with an initial positive (toward disk OD) actuator velocity value. The microprocessor 100 will then output a value to VCM driver 106 to generate a sufficiently large current to coil 21 to unlatch the actuator. Subsequently the current to coil 21 will be reversed once the actuator has unlatched so that the actuator is braked and held at the desired target velocity, $V_{targ}$. Alternatively, a short open-loop current pulse may be applied to the coil 21 to unlatch the actuator 14, followed immediately by back EMF servoing to "catch" the actuator 14 and control it at $V_{targ}$.

In the preferred embodiment, once the actuator 14 has been successfully unlatched, it continues at controlled velocity under back EMF servo control until it gently impacts the OD crash stop 32. It remains there until the spindle motor 12 reaches full RPM, at which time the actuator 14 is brought back into the data region 35, either under back EMF servo control or an open loop applied torque. Alternatively, the actuator 14 may stop with the carrier anywhere in the data region 35. Once spindle operating RPM is reached, the actuator 14 is then under control of disk servo positioning information.

Entering the Landing Zone at Low RPM While Disk Drive Power Is On

In disk drives used in laptop computers there are several power-save modes of operation where disk drive power remains on but power is reduced to some of the drive components. For example, in one type of "sleep" power-save mode, power is substantially reduced or removed from the VCM driver, the servo control electronics and the read/write channel. In this mode, power may also be reduced to the microprocessor because the servo and read/write tasks are not active. In this sleep mode the actuator is moved to its parking location, power is reduced to the spindle driver and the spindle motor is turned off.

If the spindle motor 12 is to be shut down under such a power-save mode, there will be no disk servo positioning information available and a series of steps similar to those described above for exiting the landing zone at power-on are used to return the actuator 14 to the landing zone 35 at low RPM, i.e., when the spindle has decelerated to the target RPM. The only change needed to the previously described back EMF servo method is to measure the resistance R of coil 21 using a current value that holds the actuator 14 against the OD crash stop 32. This assures that $V_{bemf}=0$ during coil resistance measurement. A separate resistance measurement is preferred because the coil resistance may have drifted during disk drive operation, which would cause errors in calculating $V_{bemf}$ (Equation 2 above).

Since actuator latches are typically designed to latch with very little (or negative) applied torque, no special action needs to be taken to get the actuator 14 back into the latched state. The actuator 14 is returned to the landing zone 34 during the standby mode by using the back EMF servo to move the actuator 14 at a controlled velocity. This assures that the carrier is flying above the data region 35 but will be in contact with the surface 134 of the landing zone 34 when it enters the landing zone.

Alternatively, it may not be necessary to use any velocity control for returning to the landing zone at low RPM. Since no large latching force needs to be overcome, it may be sufficient to apply a small open loop torque to the actuator to bring it to the latched state.

Entering the Landing Zone at Low RPM with Disk Drive Power Off

Special consideration must be given to the case of entering the landing zone at low RPM after the drive has been powered off. When disk drive power is off, there must be some means to supply electrical power to circuitry for determining when the target RPM has been reached and to drive the actuator to the landing zone at that time.

Figure 7:
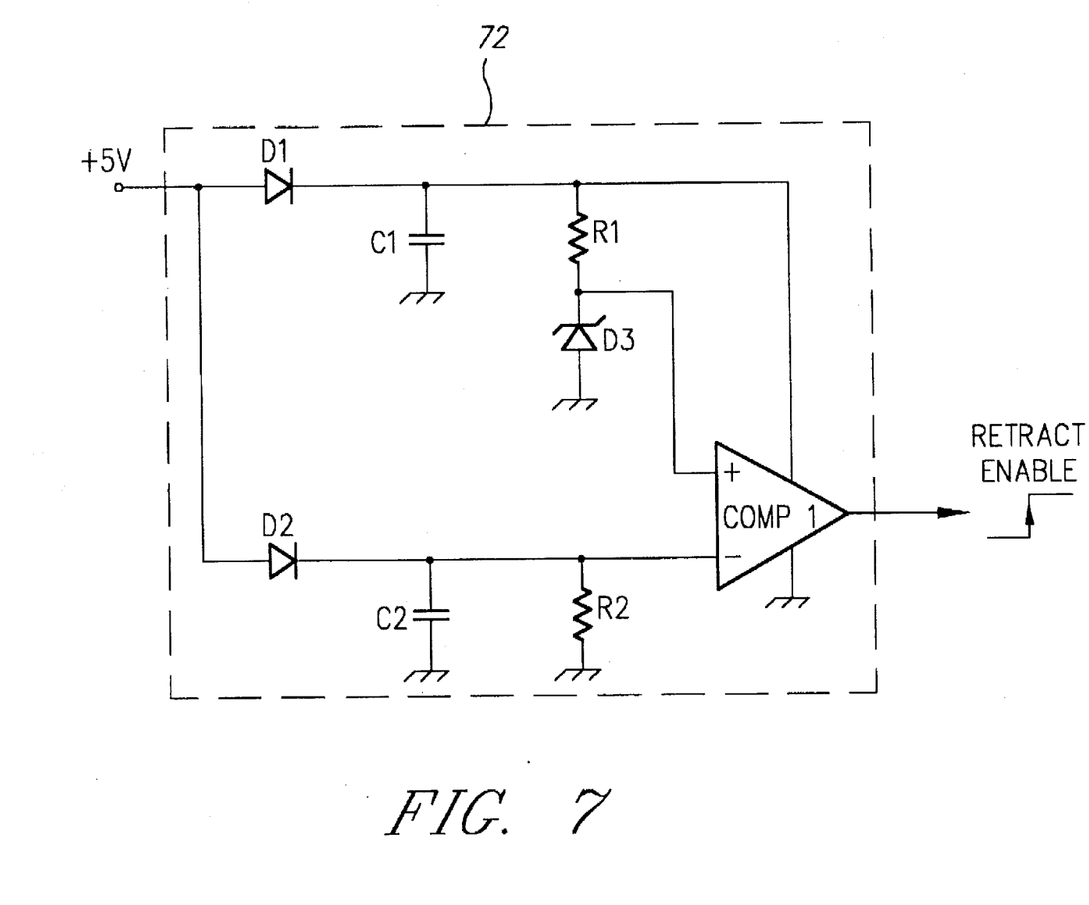
FIG. 7 is a schematic of the preferred embodiment of the actuator retract enable circuit that delays actuator retract for a predetermined time following disk drive power-down.

In the preferred embodiment a fixed time delay is used to cause the actuator 14 to retract to the landing zone 34 after power has been removed. This fixed time delay assures that the carrier enters the landing zone 34 at the preferred low RPM, instead of at the high RPM where additional time and disk speed would cause wear of the head and disk in the landing zone. FIG. 7 illustrates the details of the retract enable circuit 72 of FIG. 4 that provides the retract signal to the retract circuit 70 after a fixed time delay. This time delay is a predetermined value that is known from the known deceleration profile of the spindle motor 12. The disk drive power supply bus (shown as +5 V) charges capacitors C1 and C2 through diodes D1 and D2 when the disk drive is turned on. After power off, C1 serves as a momentary power supply to operate comparator COMP1, as well as a reference voltage generator comprised of R1 and zener diode D3. At power off, resistor R2 discharges C2 at a known rate, which triggers COMP1 to a high-level output when the voltage across C2 falls below the reference voltage across D3. Through proper component selection, any desired time delay may be generated with this circuit. The output of the comparator COMP1 triggers the retract circuit, which may be the conventional retract circuit 70 shown in FIG. 4, or the retract circuit described below and shown in FIG. 9.

Figure 8:
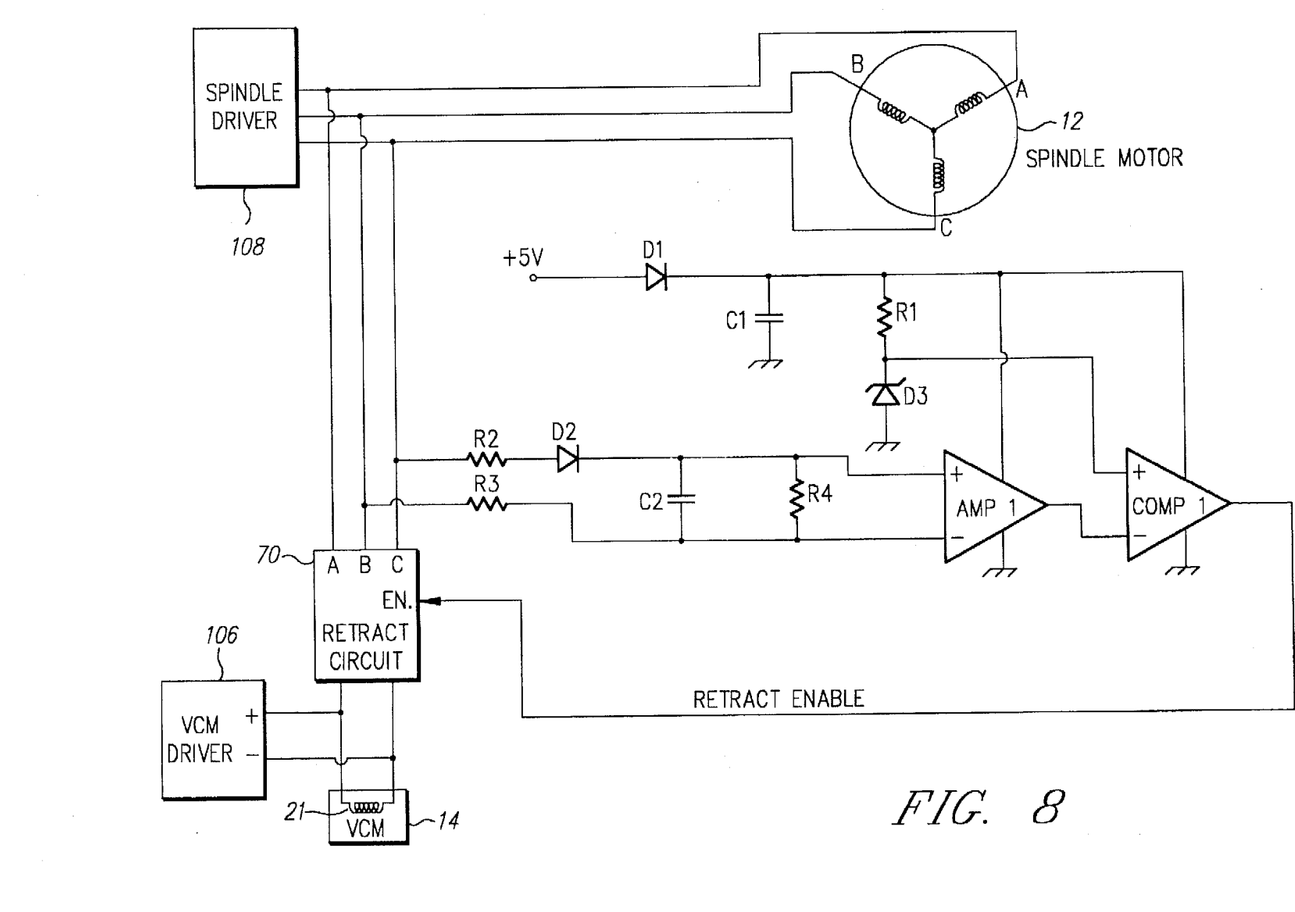
FIG. 8 is a schematic of an alternative embodiment of a circuit for delaying actuator retract until the spindle motor has reached a predetermined RPM following disk drive power-down.

As an alternative to the fixed time delay the spindle RPM may be measured and the actuator 14 retracted to the landing zone 34 when the target RPM is reached. FIG. 8 illustrates a circuit for determining the spindle RPM under power-off conditions by measuring spindle motor back EMF. When disk drive power is off, the spindle driver 108 and VCM driver 106 outputs behave as open circuits. In a similar manner to the circuit of FIG. 7, D1 and C1 provide power to comparitor COMP1 and differential amplifier AMP1. R1 and D3 provide a reference voltage to comparator COMP1 and AMP1. R2 and R3 couple the spindle motor back EMF (one phase only) through D2 to establish a filtered DC voltage across C2 and R4 which is proportional to spindle motor speed. This voltage is measured by AMP1 and applied to COMP1, whose output goes high when the spindle motor speed falls below the target RPM set by the reference voltage. The circuit of FIG. 8 may be adapted to adjust to any spindle speed target RPM by appropriate choice of R1–R4 and D3. R2 and R3 are chosen to have sufficiently high impedance that normal power-on operation of the spindle is unaffected. The output from COMP1 activates the retract circuit, which may be the conventional retract circuit 70 shown in FIG. 4, or the retract circuit described below and shown in FIG. 9.

Figure 9:
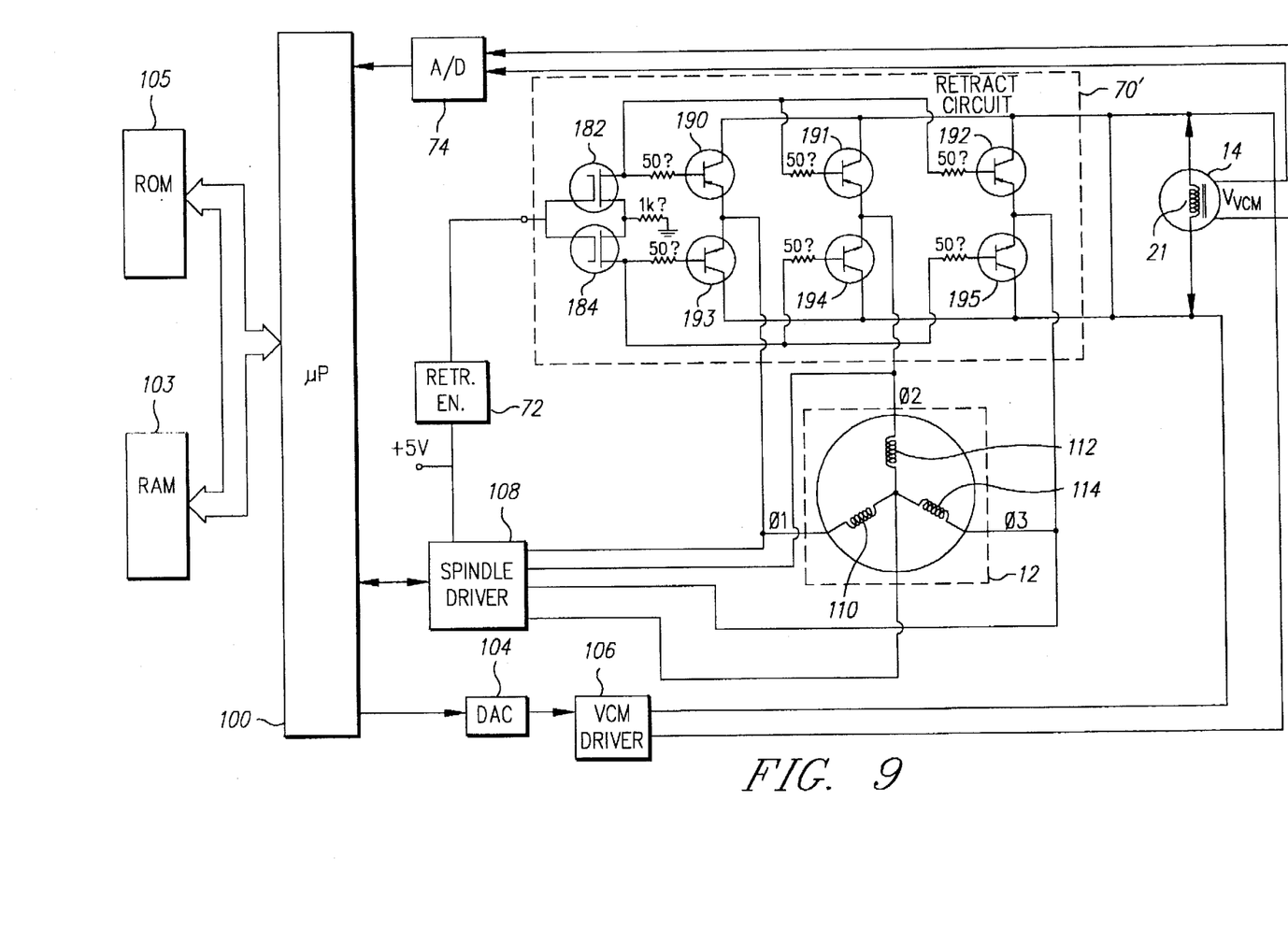
FIG. 9 is the same block diagram as FIG. 4 but with a preferred actuator retract circuit that assures sufficient torque for actuator retract when there is a delay in actuator retract following disk drive power-down.

Since the power-off retract of the actuator is being performed at low RPM, less spindle back EMF is available for the retract circuit, as compared with power off spin-down in a conventional CSS disk drive that retracts the actuator immediately without any time delay. Thus in the preferred embodiment a more efficient retract circuit is used to assure sufficient torque for actuator retract. This circuit is shown as retract circuit 70' in FIG. 9. As shown in FIG. 9, spindle motor 12, spindle motor driver 108, VCM 14, and VCM driver 106 are identical in operation as described for FIG. 4. The new rectifier circuit 70' uses a switch that closes when a positive voltage is applied. The switch may be a relay, a single FET, or other suitable switching device. In the preferred embodiment, the switch is a pair of enhancement mode FETs 182, 184 that close when a positive voltage is applied to their inputs by a signal from the retract enable circuit 72. Bipolar transistors 190–195 in rectifier retract circuit 70' are connected between spindle motor windings 110, 112, 114 and VCM coil 21. The PNP transistors 190, 191, 192 feed current to one side of coil 21, and their paired NPN transistors 193, 194, 195 feed the other side of coil 21. The VCM coil 21 and the emitter-collector junctions of bipolar transistors 190–195 are arranged in parallel with the switch and the emitter-base junctions of the bipolar transistors 190–195. As a result, the full back EMF from the spindle motor 12 is available to turn on the transistors, while the voltage drop across the emitter-collector junctions in the VCM circuit path is relatively small. The retract circuit 70' is described in IBM's U.S. Pat. No. 5,486,957.

At disk drive power-off no actuator servoing is needed to control actuator velocity when returning to the landing zone. This is consistent with the retract technique used in conventional CSS disk drives. Also, as mentioned above, there is no large torque needed for the actuator to enter the latched state, so a small torque applied open loop to the actuator is sufficient to return it to the landing zone without concern for high speed impact.

In the preferred embodiment of the present invention the disk drive is designed to operate so that the carrier both exits and re-enters the landing zone at low spindle motor RPM. This approach maximizes the improvement in disk durability at the landing zone. However, it is within the scope of the invention to have the disk drive operate so that the carrier only exits at low RPM or only re-enters at low RPM. In such a disk drive the disk durability would also be increased, but the improvement would only be half what is achievable if the preferred embodiment is implemented.

Experimental Results

The improvement in wear resistance of the head-disk interface at the landing zone by use of the present invention has been demonstrated experimentally. A conventional air-bearing slider was operated on a disk with a laser textured landing zone at different spindle motor speeds. The disk had an amorphous hydrogenated carbon protective overcoat with a thickness of 8–10 nm. The landing zone was textured with a pattern of laser bumps having a surface height of approximately 50 nm., like that shown and described in FIG. 5. When the slider was maintained over the landing zone while the spindle motor was spun up to 3600 RPM and then spun down, the disk failed at 42K CSS cycles. When the same experiment was done at a spindle motor speed of 900 RPM, the disk did not fail up to 100K CSS cycles, after which the experiment was terminated.

While the preferred embodiments of the present invention have been illustrated in detail, it should be apparent that modifications and adaptations to those embodiments may occur to one skilled in the art without departing from the scope of the present invention as set forth in the claims.

What is claimed is:

1. A contact start/stop data recording disk drive comprising:

a data disk having a textured landing zone and an untextured data region with a plurality of data tracks the surface of the textured landing zone being higher than the surface of the untextured data region;

a spindle motor connected to the disk for rotating the disk;

a transducer for writing data to or reading data from the data tracks;

a carrier for the transducer, the carrier having an air-bearing surface for supporting at least a portion of the carrier above the surface of the untextured data region when the disk is rotating at its operating speed;

an actuator connected to the carrier for moving the carrier generally radially across the disk so the transducer may access the data tracks and for maintaining the transducer on a data track, the actuator being parked with the carrier in contact with the surface of the textured landing zone when the disk is not rotating; and control circuitry coupled to the actuator and responsive to commencement of disk rotation for moving the carrier, while the air-beating surface of the carrier is still in contact with the surface of the textured landing zone, from the textured landing zone to the untextured data region, the control circuitry moving the actuator so the air-bearing surface of the carrier is supporting the carrier above the surface of the untextured data region when the carrier enters the untextured data region before the disk reaches its operating speed, whereby the air-beating surface of the carrier is never in contact with the surface of the untextured data region.

2. The disk drive according to claim 1 wherein the surface of the textured landing zone comprises a pattern of laser-induced bumps.

3. The disk drive according to claim 1 wherein the control circuitry moves the actuator out of the textured landing zone a predetermined delay time after commencement of disk rotation, said delay time corresponding to the time for the disk to reach a speed insufficient for the air-bearing surface of the carrier to support the carrier above the surface of the textured landing zone but sufficient for the air-bearing surface of the carrier to support the carrier above the surface of the untextured data region.

4. The disk drive according to claim 1 further comprising a latch for restraining the actuator in its parked location when the disk is not rotating and a crash stop for limiting movement of the actuator.

5. The disk drive according to claim 4 wherein the data region of the disk includes servo positioning information, wherein the control circuitry maintains the transducer on a data track in response to servo positioning information read by the transducer, and wherein the force required for the actuator to overcome the latch restraining force is sufficiently small so that the transducer is able to read servo positioning information after the carrier leaves the landing zone and before the actuator reaches the crash stop, whereby the actuator is under control of servo positioning information when the disk is at its operating speed.

6. The disk drive according to claim 4 wherein the actuator is a voice coil motor (VCM) actuator, and wherein the control circuitry includes circuitry for detecting the position or velocity of the actuator after the actuator is unlatched and before the disk reaches its operating speed and for controlling the amount of current applied to the VCM in response to the detected position or velocity to thereby control the velocity of the actuator, whereby after the actuator is unlatched and before the disk reaches its operating speed the actuator is prevented from reaching the crash stop with an uncontrolled velocity.

7. The disk drive according to claim 4 wherein the actuator is a voice coil motor (VCM) actuator, wherein the control circuitry includes circuitry for detecting the VCM back electromotive force voltage ($V_{bemf}$) representative of the velocity of the actuator and for controlling the amount of current applied to the VCM in response to the detected $V_{bemf}$ to thereby control the velocity of the actuator, whereby after the actuator is unlatched and before the disk reaches its operating speed the actuator is prevented from reaching the crash stop with an uncontrolled velocity.

8. The disk drive according to claim 7 wherein the latch is a magnetic latch and wherein the circuitry for controlling the VCM current in response to the detected $V_{bemf}$ applies a current level sufficient to overcome the magnetic latch restraining force.

9. The disk drive according to claim 1 further comprising retract circuitry connected to the spindle motor and the VCM for moving the actuator to cause the carrier to move into the textured landing zone when electrical power to the disk drive is removed, and delay circuitry coupled to the retract circuitry for delaying movement of the carrier into the textured landing zone until the disk rotation has decreased to a speed sufficient for the air-bearing surface of the carrier to continue to support the carrier above the surface of the untextured data region but insufficient for the air-bearing surface of the carrier to support the carrier above the surface of the textured landing zone, whereby the carrier exits the untextured data region without contacting its surface.

10. The disk drive according to claim 9 wherein the delay circuitry comprises circuitry coupled to the spindle motor for detecting when the spindle motor has reached a predetermined rotational speed after removal of electrical power to the spindle motor and for signalling the retract circuitry when said predetermined speed has been detected.

11. The disk drive according to claim 9 wherein the delay circuitry comprises circuitry responsive to removal of disk drive electrical power for signalling the retract circuitry a predetermined delay time after removal of disk drive electrical power.

12. A contact start/stop data recording disk drive comprising:

a data disk having a textured landing zone and an untextured data region with a plurality of data tracks the surface of the textured landing zone being higher than the surface of the untextured data region;

a spindle motor connected to the disk for rotating the disk;

a transducer for writing data to or reading data from the data tracks;

a carrier for the transducer, the carrier having an air-bearing surface for supporting at least a portion of the carrier above the surface of the untextured data region when the disk is rotating at its operating speed;

an actuator connected to the carrier for moving the carrier generally radially across the disk so the transducer may access the data tracks and for maintaining the transducer on a data track, the actuator being parked with the carrier in contact with the surface of the textured landing zone when the disk is not rotating;

actuator retract circuitry connected to the spindle motor and the actuator for moving the actuator to cause the carrier to move into the textured landing zone when electrical power to the disk drive is removed; and delay circuitry coupled to the retract circuitry for delaying movement of the carrier into the textured landing zone until the disk rotation has decreased to a speed sufficient for the air-bearing surface of the carrier to continue to support the carrier above the surface of the untextured data region but insufficient for the air-bearing surface of the carrier to support the carrier above the surface of the textured landing zone; whereby the carrier exits the untextured data region without contacting its surface.

13. The disk drive according to claim 12 wherein the surface of the textured landing zone comprises a pattern of laser-induced bumps.

14. The disk drive according to claim 12 wherein the delay circuitry comprises circuitry coupled to the spindle motor for detecting when the spindle motor has reached a predetermined rotational speed after removal of electrical power to the spindle motor and for signalling the retract circuitry when said predetermined speed has been detected.

15. The disk drive according to claim 12 wherein the delay circuitry comprises circuitry responsive to removal of disk drive electrical power for signalling the retract circuitry a predetermined delay time after removal of disk drive electrical power.

16. A contact start/stop magnetic recording disk drive comprising:

a magnetic recording data disk having a textured landing zone and an untextured data region with a plurality of data tracks, the textured landing zone having a surface generally defined by the peaks of a plurality of laser-induced bumps, whereby the surface of the landing zone is higher than the surface of the data region;

a spindle motor connected to the disk for rotating the disk;

a transducer for writing data to or reading data from the data tracks;

a carrier for the transducer, the carrier having an air-bearing surface for supporting at least a portion of the carrier above the surface of the disk when the disk is rotating at its operating speed;

a voice coil motor (VCM) actuator connected to the carrier for moving the carrier generally radially across the disk so the transducer may access the data tracks and for maintaining the transducer on a data track, the actuator being parked with the carrier in contact with the surface of the landing zone when the disk is not rotating;

a latch for restraining the actuator in its parked location when the disk is not rotating;

crash stop for limiting movement of the actuator near the outside diameter of the disk; and control circuitry coupled to the actuator and responsive to commencement of disk rotation for moving the carrier out of the landing zone toward the data region a predetermined delay time after commencement of disk rotation while the air-bearing surface of the carrier is still in contact with the surface of the landing zone, said delay time corresponding to the time for the disk to reach a speed less than the operating speed of the disk drive but sufficient for the air-bearing surface of the carrier to support the carrier above the surface of the data region, whereby the air-bearing surface of the carrier is never in contact with the surface of the data region, the control circuitry including circuitry for detecting the position or velocity of the actuator after the actuator is unlatched and before the disk reaches its operating speed and for controlling the amount of current applied to the coil of the VCM in response to the detected position or velocity, to thereby prevent the actuator from reaching the crash stop with an uncontrolled velocity.

17. The disk drive according to claim 16 wherein the actuator position or velocity detecting circuitry detects the VCM back electromotive force voltage ($V_{bemf}$) representative of the velocity of the actuator.

18. The disk drive according to claim 17 wherein the latch is a magnetic latch and wherein the circuitry for controlling the VCM coil current in response to the detected $V_{bemf}$ applies a current level sufficient for the actuator to overcome the magnetic latch restraining force.

19. The disk drive according to claim 16 further comprising retract circuitry connected to the spindle motor and the VCM for moving the actuator to cause the carrier to move into the landing zone when electrical power to the disk drive is removed, and delay circuitry coupled to the retract circuitry for delaying movement of the carrier into the landing zone until the disk rotation has decreased to a speed sufficient for the air-bearing surface of the carrier to continue to support the carrier above the surface of the data region but insufficient for the air-bearing surface of the carrier to support the carrier above the surface of the landing zone, whereby the carrier exits the untextured data region without contacting its surface.

20. The disk drive according to claim 19 wherein the delay circuitry comprises circuitry coupled to the spindle motor for detecting when the spindle motor has reached a predetermined rotational speed after removal of electrical power to the spindle motor and for signalling the retract circuitry when said predetermined speed has been detected.

21. The disk drive according to claim 19 wherein the delay circuitry comprises circuitry responsive to removal of disk drive electrical power for signalling the retract circuitry a predetermined delay time after removal of disk drive electrical power.

* * * * *